United States Patent [19]

Stucki

[11] 4,427,504

[45] Jan. 24, 1984

[54] PROCESS FOR THE CONTINUOUS PRODUCTION OF NITRIC OXIDE (NO)

[75] Inventor: Samuel Stucki, Baden, Switzerland

[73] Assignee: BBC Brown, Boveri & Company, Limited, Baden, Switzerland

[21] Appl. No.: 344,034

[22] Filed: Jan. 29, 1982

[30] Foreign Application Priority Data

Feb. 25, 1981 [AT] Austria .................................. 872/81

[51] Int. Cl.³ .......................... C25B 1/00; C25B 1/12
[52] U.S. Cl. .................................. 204/101; 204/129; 423/359; 423/393; 423/396; 423/397; 423/405; 423/DIG. 11
[58] Field of Search ....................... 204/101, 129, 103; 423/DIG. 11, 359, 393, 405, 396, 397

[56] References Cited

U.S. PATENT DOCUMENTS

4,107,277 8/1978 Da Rosa .............................. 204/129

Primary Examiner—R. L. Andrews
Attorney, Agent, or Firm—Oblon, Fisher, Spivak, McClelland & Maier

[57] ABSTRACT

Nitric oxide is prepared by the oxidation of ammonia produced by the Haber-Bosch synthesis technique by (a) vaporizing and heating water to superheated steam; (b) electrolyzing the superheated steam in a high temperature electrolysis cell to oxygen and hydrogen; (c) reacting said hydrogen with atmospheric nitrogen thereby forming ammonia by the Haber-Bosch process; and (d) oxidizing said ammonia to nitric oxide and water vapor in the anode of said electrolytic cell with the oxygen produced by said electrolysis.

8 Claims, 6 Drawing Figures

PROCESS FOR THE CONTINUOUS PRODUCTION OF NITRIC OXIDE (NO)

BACKGROUND OF THE INVENTION

1. Field of the Invention

The present invention relates to a process for the production of nitric oxide (NO), and to an apparatus for conducting the process.

2. Description of the Prior Art

Nitric acid is presently used as the raw material for the production of numerous chemical compounds. Nitric acid is used extensively in the production of synthetic nitrogenous fertilizer, and is currently produced in industrial quantities by the combustion of ammonia with atmospheric oxygen at 800° C. over platinum/rhodium catalysts. The ammonia in turn is produced by the Haber-Bosch process from atmospheric nitrogen and hydrogen.

Proposals have been made in the past to utilize the heat produced by the strongly exothermic combustion of ammonia, by carrying out the reaction in a high-temperature fuel cell (Roger D. Farr and Costas G. Vayenas, Ammonia High Temperature Solid Electrolyte Fuel Cell, *J. Electrochem. Soc.*, July 1980, pages 1478–1483). At least a part of the free enthalpy ($\Delta G$) characteristic of the reaction, would then be available as electrical energy at the terminals of the cell.

Although a fuel cell of this type may be industrially feasible, its profitability is doubtful because of the considerable expenses involved. A need therefore continues to exist for an improved technique of producing nitric oxide.

SUMMARY OF THE INVENTION

An object of the present invention is to provide a process and apparatus for the continuous production of nitric oxide (NO) which is the raw material for the downstream production of nitric acid and nitrogenous fertilizers.

Another object of the invention is to provide a process for the production of NO which reduces the consumption of energy, allows the closed circulation of materials and optimizes the NO production unit.

Still another object of the invention is to provide an NO production unit which can be integrated into a complex also comprising apparatus for the synthesis of ammonia by the Haber-Bosch process.

Briefly, these objects and other objects of the present invention as hereinafter will become more readily apparent can be attained by a process for producing nitric oxide by the oxidation of ammonia produced by the Haber-Bosch synthesis technique by (a) vaporizing and heating water to superheated steam; (b) electrolyzing the superheated steam in a high temperature electrolysis cell to oxygen and hydrogen; (c) reacting said hydrogen with atmospheric nitrogen thereby forming ammonia by the Haber-Bosch process; and (d) oxidizing said ammonia to nitric oxide and water vapor in the anode of the same electrolytic cell with the oxygen produced by said electrolysis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The salient guiding concept behind the present invention is the combination of an electrolysis step where water is electrolyzed to hydrogen and the oxygen being utilized for the oxidation of ammonia to nitric oxide, all processes in a single common apparatus.

Figure 1:
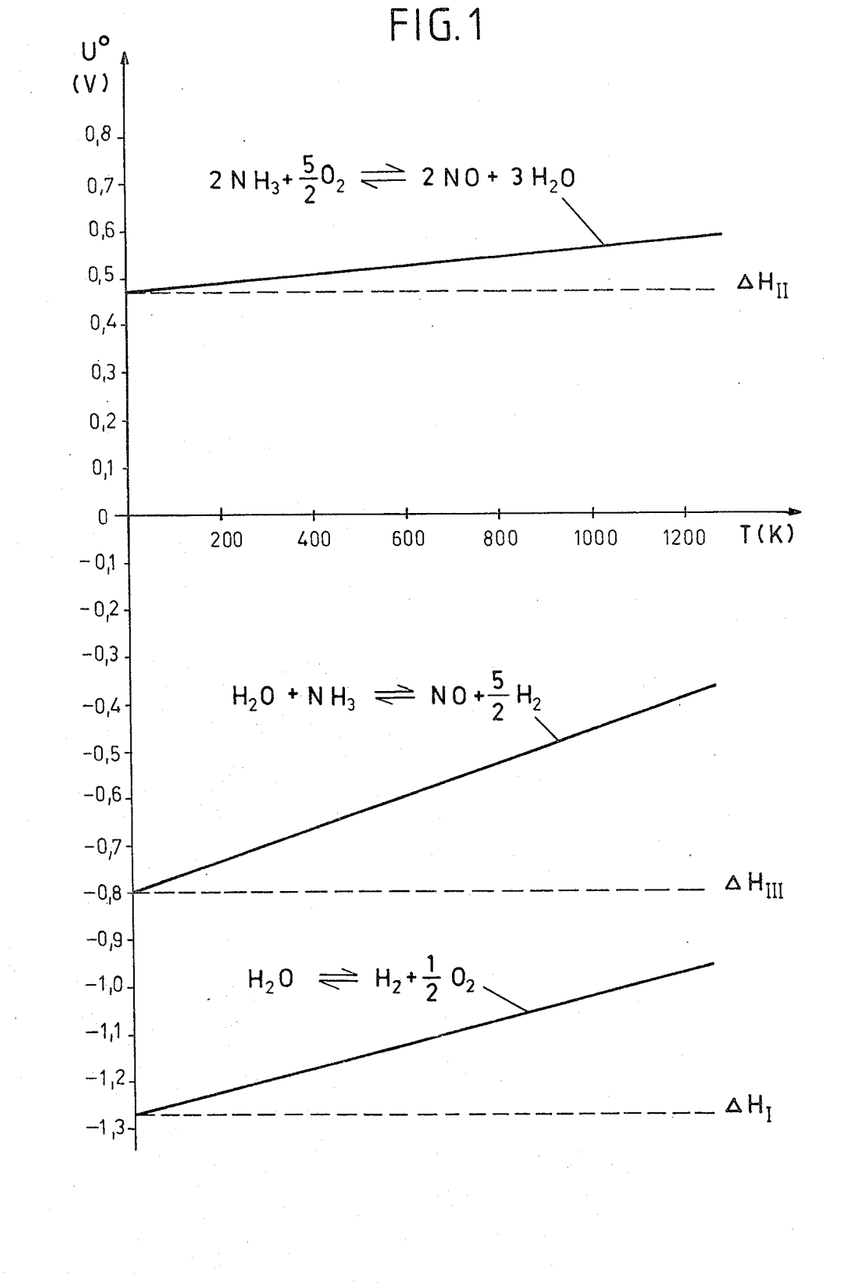
FIG. 1 shows the chemical-thermodynamic equilibria of the reactions in the present process.

FIG. 1 shows a graphical representation of the chemical-thermodynamic equilibrium conditions of the reactions in the process. The abscissa represents the absolute temperature scale in degrees Kelvin, and the ordinate represents the electrochemical potential U° (standard EMF) in volts, which corresponds to the free enthalpy $\Delta G°$. The following equation applies:

$$U° = -\Delta G°/ZF$$

wherein Z represents the number of charges exchanged during the charge reversal of the ions and F is the Faraday constant.

The lowest pair of lines pertains to the reactions taking place in the electrolysis of water:

$$H_2O \rightleftharpoons H_2 + \tfrac{1}{2}O_2$$

The theoretical decomposition potential (equilibrium potential) at absolute zero is just under $-1.3$ V, which chemically and thermodynamically corresponds to the enthalpy $\Delta H_I$ represented by a broken horizontal line. At a temperature of 1073° K. (800° C.), the potential is still about $-1.0$ V.

The topmost straight line corresponds to the reactions taking place in the oxidation of ammonia, such as can be carried out, for example, in a fuel cell (the reverse of electrolysis):

$$2NH_3 + 5/2 O_2 \rightleftharpoons 2NO + 3H_2O$$

The equilibrium potential at absolute zero is in this case just under $+0.5$ V (enthalpy $\Delta H_{II}$) (broken line) and hardly rises with the temperature.

The middle straight line results from the combination, according to the invention, of the abovementioned processes, which combination can be regarded as a depolarized electrolysis:

$$H_2O + NH_3 \rightleftharpoons NO + 5/2 H_2$$

In this case, the ammonia fed in on the anode side acts as a depolarizer for the oxygen formed there. At absolute zero, a cell of this type still has an equilibrium potential of about −0.8 V (enthalpy $\Delta H_{III}$) (broken line), and at a temperature of 1073° K. this is still just under −0.5 V. Thus, compared with the pure electrolysis of water, about 0.5 V is gained on the average, and the nitric oxide (NO) desired for the production of nitric acid is obtained directly.

Figure 2:
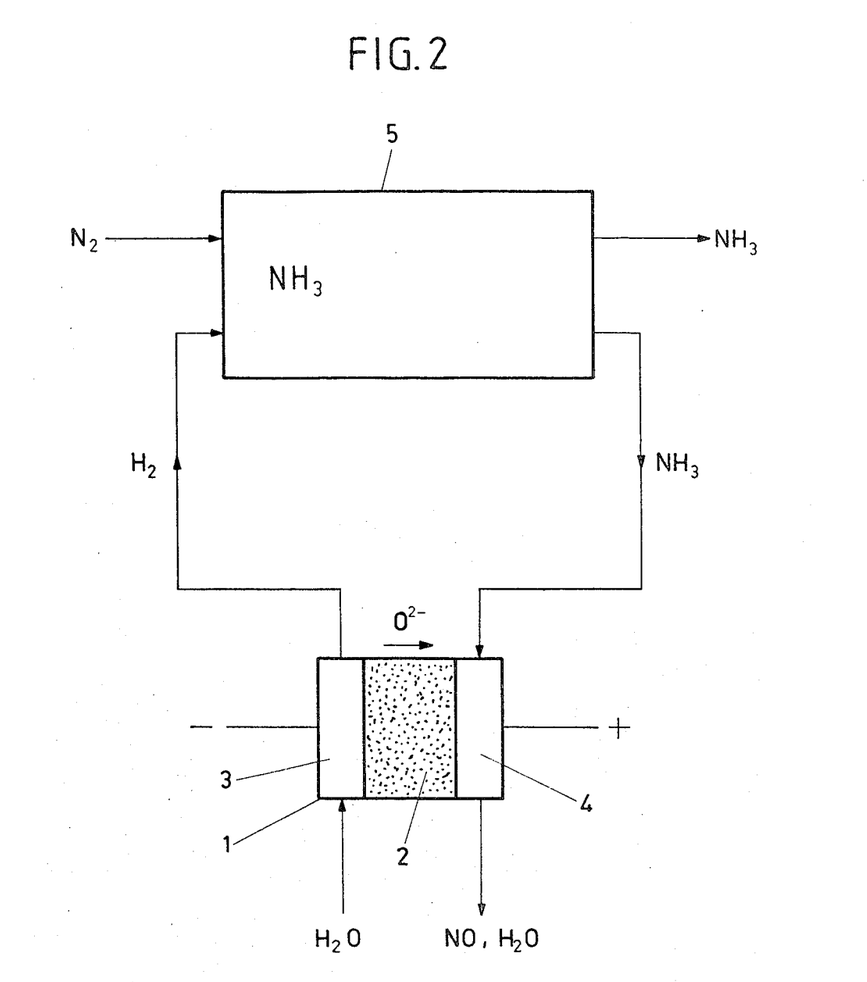
FIG. 2 shows the flowsheet (block diagram) of the basic principle of the present process.

FIG. 2 is a flowsheet of the basic aspects of the process, as a block diagram. Cell 1 is a high-temperature electrolysis cell which is maintained at temperatures from 800° to 1000° C. Cell 1 contains a high-temperature solid electrolyte 2 which is suitable for transporting oxygen ions. The direction of migration of the oxygen ions is represented by the symbol $O^{2-}$ together with the arrow. Cell 1 contains porous cathode 3 and porous anode 4. Water vapor is fed into the cathode and $NH_3$ is fed into the anode. The $H_2$ formed on the cathode 3 is reacted with $N_2$ (atmospheric nitrogen) to give $NH_3$ in a conventional $NH_3$ synthesis apparatus 5 in accordance with the Haber-Bosch process. If all the $H_2$ originating from the electrolysis cell 1 is converted in 5, an excess of $NH_3$ is formed which can be utilized for other purposes. NO (nitric oxide) and $H_2O$ are formed on the anode 4.

Figure 3:
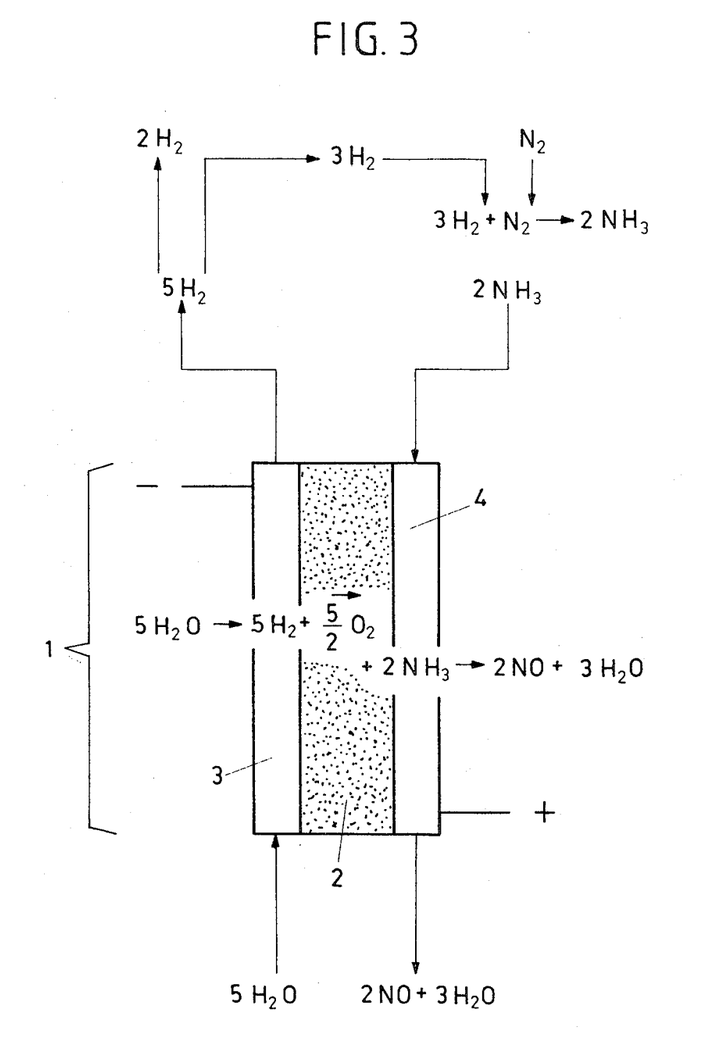
FIG. 3 shows the course of the chemical and electrochemical reactions and their stoichiometry of the present invention.

FIG. 3 shows the course of the chemical and electrochemical processes, mainly those in the electrolytic cell 1, taking into account the stoichiometry of the reactions. The reference numerals correspond to those of FIG. 2. The electrolysis process taking place on the cathode side is mainly $$5H_2O \rightarrow 5H_2 + 5/2 O_2,$$

whilst the ammonia fed in is oxidized on the anode side:

$$5/2 O_2 + 2NH_3 \rightarrow 2NO + 3H_2O.$$

Normally, assuming complete conversion, 5 moles of $H_2O$ vapor and 1 mole of $N_2$ (atmospheric nitrogen) are required as the starting materials. Three moles of the 5 moles of $H_2$ formed as an intermediate are utilized for the synthesis of $NH_3$. Two moles of the latter are formed which, in the combined cell, react with 5/2 moles of $O_2$ to give 2 moles of NO and 3 moles of $H_2O$. The 2 moles of $H_2$ in excess can be used for further purposes, above all for the production of additional $NH_3$, or in some other way.

Figure 4:
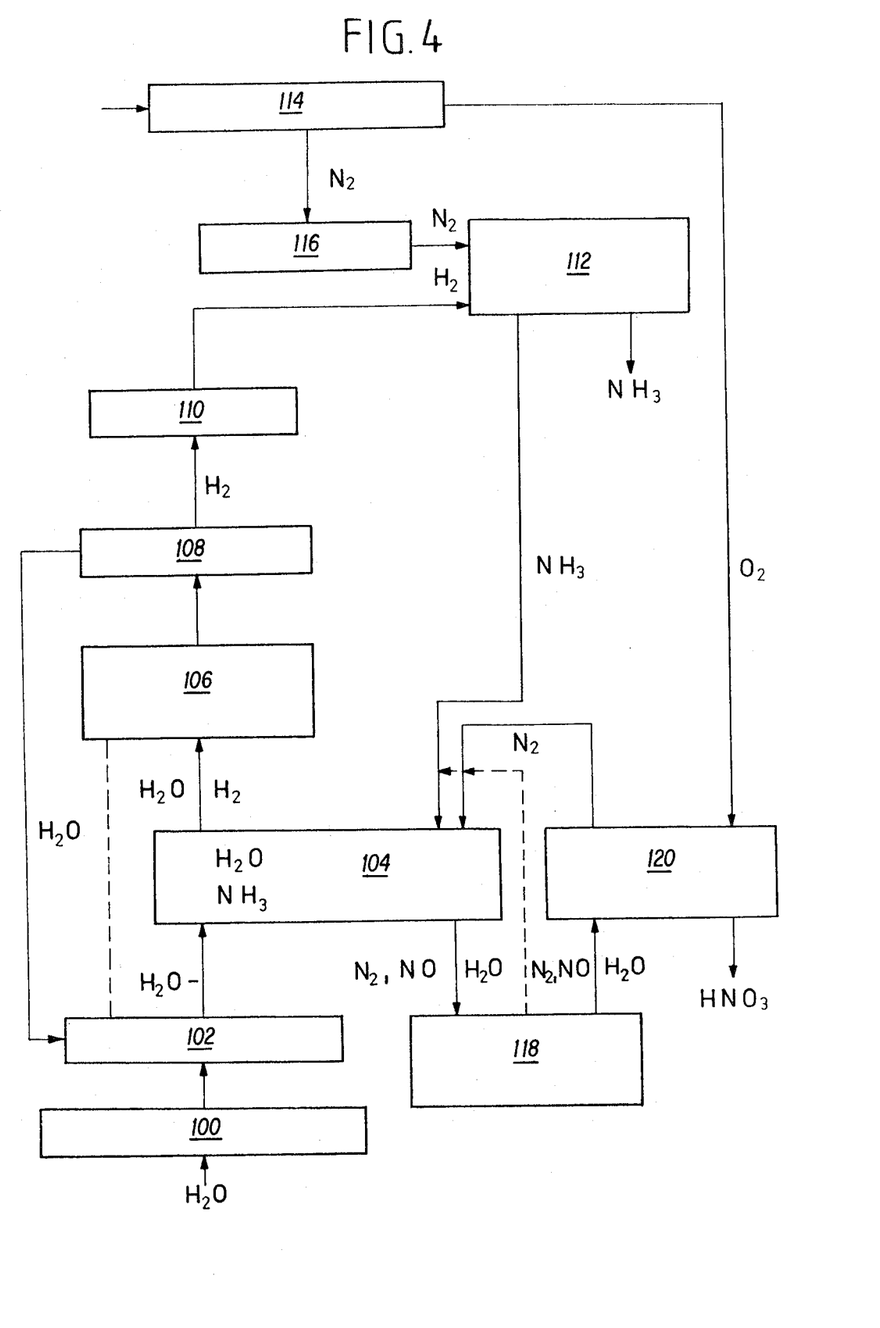
FIG. 4 shows the flowsheet of a possible variant of the process integrated into a complex of units.

FIG. 4 is a flowsheet of an embodiment of the process which, in this case, is integrated into a complete complex of units for the production of nitric acid. The starting materials used are air and water, and $HNO_3$ and $NH_3$ are obtained as the end products. Initially, the water is freed, in a water treatment unit 100, from any dissolved or suspended liquid, gaseous and/or solid harmful substances and is then passed into the steam generator 102 and superheated. The superheated steam passes into a battery of high-temperature electrolytic cells 104. The resulting mixture of $H_2$ and excess steam is used for heat recovery in a heat exchanger 106, which heat can be reutilized, for example in the generation of steam. This step is indicated in the Figure by a broken line. After further cooling, the mixture passes through the condensation unit 108, where the water condenses out and is recycled to the steam generator 102. The $H_2$ is fed to the Haber-Bosch synthesis unit 112, after it has been compressed in unit 110. The air is first separated into $N_2$ and $O_2$ in an air distillation unit 114 (for example a Linde-Fränkl unit or a Claude unit), and the $N_2$ is used for the Haber-Bosch synthesis, after it has passed through a compression unit 116. The $NH_3$ produced is passed to the anode side of the high-temperature cell 104, together with $N_2$ as a circulating gas. The gas mixture which is obtained on the outlet side and which consists of NO, $N_2$ and $H_2O$, is cooled in a heat exchanger 118, in order to recover heat. The heat can be utilized, for example, for preheating the mixture of $NH_3$ and $N_2$ on the inlet side, as indicated by the broken line. The last stage is a hydration and oxidation step in which $O_2$ coming from the air distillation unit 114 is reacted with the gas mixture which consists of NO, $N_2$ and $H_2O$ in unit 120 and comes from the electrolytic cell. The end product is $HNO_3$ which can be used, for example, for the production of synthetic fertilizer. In the unit operating in accordance with FIG. 4, excess $NH_3$ is also produced, which can be used for a variety of purposes.

Figure 5:
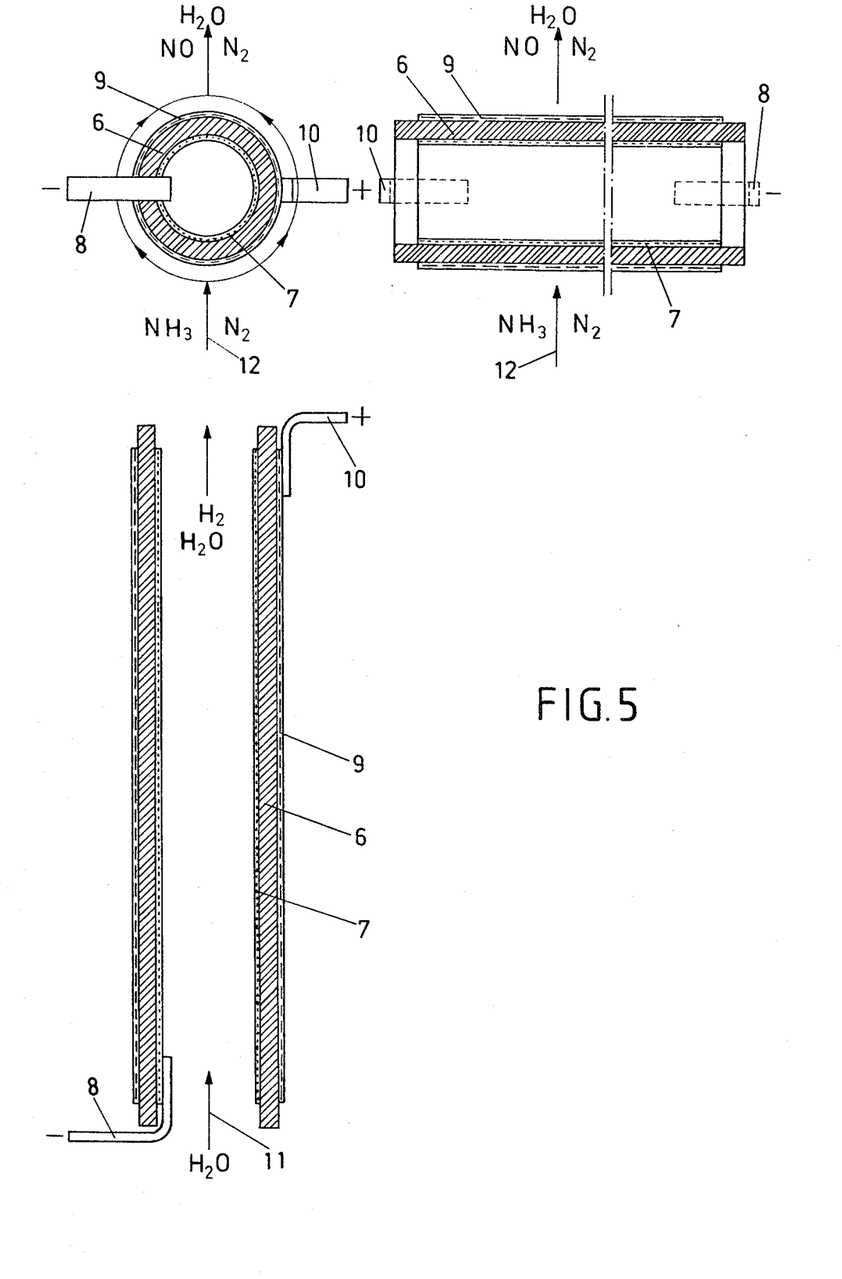
FIG. 5 shows the basic construction of an individual high-temperature electrolytic cell.

FIG. 5 shows the basic construction of an individual high-temperature electrolytic cell in three views. Ceramic tube 6 made of, for example, $ZrO_2$ stabilized by yttrium, functions as a solid electrolyte (high-temperature ionic conductor) and which, on its surface, has an inner porous electronically conducting layer 7 (for example platinum) as the cathode and an outer porous electronically conducting layer 9 (for example platinum) as the anode. The porous layer 7 is firmly connected mechanically and electrically to a negative terminal 8, and the porous layer 9 is firmly connected mechanically and electrically to a positive terminal 10. The layers 7 and 9 do not extend up to the end faces of the ceramic tube 6, in order to eliminate the risk of shunts and short-circuits. A stream of $H_2O$ vapor 11 flows axially through the inside (cathode side, $H_2$ side) of the ceramic tube 6, whilst at the same time a stream 12 of $NH_3/N_2$ gas flows transversely against the outside (anode side, $O_2$ side) (crossflow principle). On the inner outlet side, an $H_2/H_2O$ mixture axially leaves the ceramic tube 6, whilst on the outside an $NO/N_2/H_2O$ mixture separates from the tube at the rear stagnation point. All the directions of flow are marked by arrows.

Figure 6:
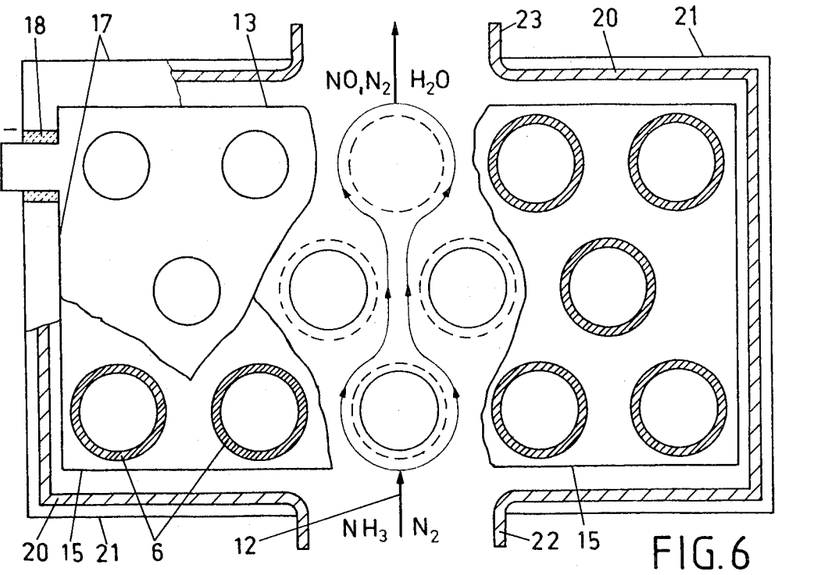
FIG. 6 diagrammatically shows the construction of an electrolysis device assembled from several individual cells.

FIG. 6 diagrammatically shows the construction of an electrolysis device assembled from several individual cells in both the elevation (cross-sectional) and planar (longitudinal) views. The reference numerals 6, 7 and 9 correspond to those in FIG. 5. This apparatus represents a tube bundle which consists of several ceramic tubes 6 in a parallel arrangement, a parallel flow passing through the inside of the individual tubes 6, and a parallel flow going around the outside of the tubes. The gas streams 11 and 12 indicated by arrows also correspond to those in FIG. 5. The ceramic tubes 6, extending in parallel, are held together in each case by a negative or positive unipolar plate (13, 15) arranged on the end faces. The negative plate 13 has tube stubs (nipples) 19 which engage with the inside of the ceramic tubes 6 and make electric contact with the inner porous layer 7 serving as the cathode. The positive plate 15 has holes into which the ceramic tubes 6 are inserted in such a way that contact with the outer porous layer 9 is ensured. The two plates each have an extension, serving as a terminal (14, 16), which is in each case held in a bushing insulator 18. The gas stream 12 is passed through an outer vessel 20 which is provided with flanges 21 and has pipe connections 22 and 23 on the inlet side and outlet side respectively. The space available to the gas stream 12 is also confined on the end face by the insulat- ing partitions 17 which are located in the same planes as the unipolar plates 13 and 15.

On its inlet side, the gas stream 11 is taken through a cover 24 which is provided with a pipe connection 26 and confines the space on the end face of the tube bundle. Analogously, on the outlet side, there is a cover 27 with a pipe connection 29 for collecting the $H_2/H_2O$ gas stream and allowing it to flow into the next chamber. The covers 24 and 27 are each provided with flanges 25 and 28 which, with the interposition of the insulating partitions 17, are joined to the flanges 21 of the outer vessel 20.

Having generally described this invention, a further understanding can be obtained by reference to certain specific examples which are provided herein for purposes of illustration only and are not intended to be limiting unless otherwise specified.

EXAMPLE 1

The high-temperature electrolytic cell used was a ceramic tube 6 of zirconium oxide which was stabilized with 8% yttrium oxide. The tube 6 had a length of 200 mm and an external diameter of 20 mm, with a wall thickness of 1.5 mm. The axial length of the porous layers 7 and 9 (of Pt) serving as the cathode and anode was 160 mm. The thickness of the electrode layers was $3\mu$. The surface area of the outer layer 9 (anode) was 100 $cm^2$. The cell was heated to 1000° C. in a furnace and maintained at this temperature. Steam at the same temperature and under a pressure of 0.1 MPa was then passed through the ceramic tube 6 at a rate of 3.5 l/minute, corresponding to a mean flow velocity of 18.6 cm/second. The terminals 8 and 10 were connected to a source of direct current and the cell was loaded with a current of 50 A, which corresponds to a current density of 0.5 $A/cm^2$ on the anode side. The voltage between the electrodes was 1.25 V. This value corresponds to the decomposition potential for the electrolysis of pure water vapor with oxygen being evolved at the outer porous layer 9 (anode). A mixture consisting of ammonia and nitrogen was then fed to the electrolytic cell in such a way that there was a transverse flow of gases around the outside of the ceramic tube 6 (cross flow principle), the gas stream being brought into intimate contact with the outer porous layer 9. In the present arrangement, the ratio of $NH_3$ to $N_2$ was 10:90% by volume. The total gas rate per unit time was a 4 l/minute, corresponding to a maximum tangential flow velocity of 5 cm/second on the ceramic tube 6. The cross-flow principle and the optimum flow velocity on the ceramic tube 6 ensure that the residence time of the $NH_3$ molecules on the porous layer 9 is quite short and, as an order of magnitude, is only about 1 millisecond. In this way, the detrimental formation of nitrogen and water vapor, proceeding according to the equation below, on the catalytically active platinum is largely suppressed:

$$4NH_3 + 6NO \rightleftarrows 5N_2 + 6H_2O$$

Moreover, because of the presence of an excess of $N_2$ in the gas stream 12, the equilibrium is shifted to the left and the detrimental loss of NO is depressed. Furthermore, the overall yield of NO is increased by the admixture of $N_2$. As a result of feeding the $NH_3/N_2$ gas stream 12 to the outside of the ceramic tube 6, the cell voltage fell from its original value of 1.25 V (electrolysis of water) to 0.75 V (depolarized electrolysis). The reduction in the cell voltage by 0.5 V thus represents a considerable saving of energy of 40% as compared with the pure electrolysis of water. An analysis of the gases on the outlet side of the cell showed the following:

| | | | |
|---|---|---|---|
| Cathode side (inside) | $H_2O$ vapor | 90% | (excess) |
| | $H_2$ | 10% | |
| Anode side (outside) | NO | 8% | (95% of the stoichiometric quantity) |
| | $N_2$ | 79% | |
| | $H_2O$ | 13% | |

In principle, high temperature solid electrolytes other than $ZrO_2$ can also be used for the manufacture of ceramic tube 6. Moreover, the inner layer (7) and outer porous layer 9, which respectively act as the cathode and anode, are not limited to the use of platinum. For example, other platinum metals, such as palladium or mixtures of different platinum metals or their oxides, can also be used. Moreover, a wide range of composite materials, for example, mixtures of alkaline earth metal oxides, rare earth metal oxides and other oxides, can also be used alone or in combination with noble metals and alloys thereof.

In principle, the electrolytic cell can also have dimensions which differ from those indicated in the illustrative example. It is desirable to match the dimensions and the flow velocities of the gas mixtures concerned to one another and to optimize them. In order to minimize the ohmic voltage drop in the cell, the cell can be modified by making the wall thickness of the ceramic tube 6 as small as possible and making its surface area as large as possible. Of course, there are limits to the extent to which the cell can be so modified in terms of geometry and construction and of mechanical strength.

The process can also be conducted under an elevated pressure, advantageously a pressure of up to 1 MPa.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the production of nitric oxide from ammonia produced by the Haber-Bosch synthesis, comprising:
   (a) vaporizing and heating water to superheated steam;
   (b) electrolyzing the superheated steam in a high temperature electrolysis cell to oxygen and hydrogen;
   (c) reacting said hydrogen with atmospheric nitrogen thereby forming ammonia by the Haber-Bosch process; and
   (d) oxidizing said ammonia to nitric oxide and water vapor in the anode of said electrolytic cell with the oxygen produced by said electrolysis.

2. The process of claim 1 wherein said water prior to vaporization is chemically and physically treated, and wherein the electrolysis of water and the oxidation of ammonia are conducted at a temperature in the range of from 800° to 1000° C. and under a pressure from 0.1 to 1 MPa.

3. The process of claim 1, wherein said electrolysis cell comprises a cylinder formed of an insulating ceramic material, a cathode as a layer of material deposited on the interior surface of said cylinder and an anode as a layer of material deposited on the exterior surface of said cylinder.

4. The process of claim 3, wherein said electrolysis is conducted by passing said heated steam through said cylinder thereby generating hydrogen on said cathode which passes out of the cylinder with the gases discharged from the cylinder and by directing a flow of ammonia and nitrogen against the anode on the exterior surface of said cell in a cross-flow direction to the direction of flow of the steam into said cell, whereby said ammonia is oxidized to nitric oxide.

5. The process of claim 1, wherein, at the inlet to said electrolysis cell, up to 9 times the volume of nitrogen is admixed as a circulating gas with ammonia, and wherein the electrolysis cell is maintained at a temperature of at least 800° C. by preheating the gaseous reactants and wherein said cell is subjected to a current density of 0.5 A/cm$^2$ by applying a voltage of 0.75 V to said cell.

6. The process of claim 1, wherein the gaseous reactants function as heat carriers and thereby provide means for heating the electrolytic cell and for recovering heat from said cell.

7. The process of claim 1, which further comprises forming nitric acid by further oxidizing said nitric oxide and hydrating the oxidized product.

8. The process of claim 1, wherein the excess hydrogen produced by said electrolysis step is combined with ammonia and the mixture reacted with nitric acid to form ammonium nitrate fertilizer.

* * * * *